United States Patent [19]
Puri

[11] Patent Number: 5,440,627
[45] Date of Patent: Aug. 8, 1995

[54] COMPUTER PHONE DIALING SYSTEM

[76] Inventor: Rajendra P. Puri, 2133 W. Tanglewood Dr., Tucson, Ariz. 85745

[21] Appl. No.: 231,228

[22] Filed: Apr. 21, 1994

[51] Int. Cl.$^6$ .............................................. H04M 1/27
[52] U.S. Cl. .................... 379/355; 379/354; 379/356; 379/357; 379/216
[58] Field of Search ............... 379/355, 354, 356, 357, 379/216

[56] References Cited

U.S. PATENT DOCUMENTS

| | | | |
|---|---|---|---|
| 4,661,976 | 4/1987 | Basch | 379/354 |
| 4,839,919 | 6/1989 | Borges et al. | 379/355 |
| 4,868,848 | 9/1989 | Magnusson et al. | 379/355 |
| 4,882,750 | 11/1989 | Henderson et al. | 379/355 |
| 4,941,172 | 7/1990 | Winebaum et al. | 379/355 |
| 5,144,654 | 9/1992 | Kelley et al. | 379/355 |

*Primary Examiner*—James L. Dwyer
*Assistant Examiner*—Jacques M. Saint-Surin
*Attorney, Agent, or Firm*—Ogram & Teplitz

[57] ABSTRACT

A secure telephone/computer combination which permits the computer to make automated dialing of a telephone by communicating signals to the interconnection between the telephone's number-pad and the electronics which communicate with the telephone line. The computer selects, or the operator directs the computer to select, a telephone number. This selected telephone number is used by the computer to selectively activate the proper connection in the telephone. As example, assume the selected telephone number is 703-305-8062. The computer first sends a signal to the wire connecting the "7" on the keypad to the telephone's electronics, then the wire connecting the "0", then the wire connecting the "3", etc. In this manner, the telephone's electronics treat the incoming signals in the same manner as if the operator had dialed the number at the telephone. An important attribute of this invention is that while it permits the computer to dial, there is no way a third party can obtain access to the computer via the telephone since there is no communication channel between the two; thereby providing exceptional security for the computer.

22 Claims, 3 Drawing Sheets

COMPUTER PHONE DIALING SYSTEM

BACKGROUND OF THE INVENTION

This invention relates generally to computer systems and more particularly to computer systems which interface with telephone systems.

Ever since Dr. John Mauchly and J. Pesper Eckert put together some eighteen thousand vacuum-tubes to make the "ENIAC" (electronic numerical integrator and calculator), computers have been increasingly used to make life easier and simpler for human operators.

As the computer developed into the easy to use form of today, there was a significant push to marry it with the telephone to create an even more useful device to ease human work.

To do this combination, the approach which has been taken is known as a "modem". A modem is a combination modulator and demodulator which converts the binary digital information from the computer to an audio tone signal suitable for use by the telephone line. The modem thereby permits the computer access to the phone line itself.

A variety of modems have been developed. Typical modems and their capabilities are described in: U.S. Pat. No. 5,144,654, entitled "Automatic Telephone Dialer System with Printed Storage", issued to Kelley et al. on Sep. 1, 1992; and U.S. Pat. No. 4,661,976, entitled "Automatic Telephone Dialer Utilizing an Electronic Telephone Book", issued to Basch on Apr. 28, 1987.

Modems though permit a two way communication. They are modulators-demodulators and as such they permit computer to transmit through the telephone line, and also to receive data and instructions through the same telephone line. It is this remote access to the computer that can create severe security breaches. In many situations, there is a pronounced need to keep the contents of the computer secure and safe.

Security for a computer with a modem has developed into an elaborate arrangement to keep the computer's contents secure from both tampering and viewing by unauthorized personnel. Typical security measures include passwords, call-back identifications, and restricted hosts.

As is well known though, these measures merely provide extra challenges for computer "hackers" who find it exciting to enter a secure computer. Even strict Federal Laws have not done much to curtail these "break-ins".

Due to these facts, many governmental and private agencies have banned all modems from their premises. Although this eliminates any routes the hackers may have into the computers, it also keeps the power of the computer from being applied to the telephone.

It is clear from the foregoing that there is a need for a secure way to incorporate a computer with telephone capabilities.

SUMMARY OF THE INVENTION

The invention is a secure phone/computer combination which permits the computer to make automated dialing of a phone by communicating signals to the interconnection between the phone's number-pad and the electronics which communicate with the telephone line. The computer selects, or the operator directs the computer to select, a phone number. This selected phone number is used by the computer to selectively activate the proper connection in the phone. For example, assume the selected phone number is 703-305-8062. The computer first sends a signal to the wire connecting the "7" on the keypad to the phone's electronics, then the wire connecting the "0", then the wire connecting the "3", etc. In this manner, the phone's electronics are "fooled" and treat the incoming signals in the same manner as if the operator had dialed the number at the phone.

An important attribute of this invention is that, while it permits the computer to dial, there is no way a remote third party can obtain access to the computer via the telephone since there is no communication channel going from the telephone to the computer; thereby providing exceptional security for the computer.

This aspect of the invention is important since it maintains the computer as "sterile" so that hackers do not have any access to the computer whatsoever. The computer though is able to direct phone calls automatically so that the operator/user's hands are freed up and a routine task, phone dialing, is now taken over by the computer.

In practice, the computer either selects, or the operator selects via the computer, a telephone number to be dialed. The computer automatically dials the telephone number and the operator/user is able to converse with the other party via the traditional audio telephone circuits.

The invention has uses in a variety of governmental agencies which require their computers to be tamper-proof but in which the operator is required to make numerous phone calls to parties and to document the results of the phone call on the computer. This would include governmental offices of the Internal Revenue Services, the Census Bureau, police departments, and school systems; it would also include commercial enterprises such as phone solicitation, and accounts receivable departments.

The invention, together with various embodiments thereof will be fully described by the accompanying drawings and the following descriptions thereof.

DRAWINGS IN BRIEF

FIGS. 3A, 3B, 3C, and 3D are block diagrams illustrating various embodiments of the invention showing differing configurations.

Figure 4:
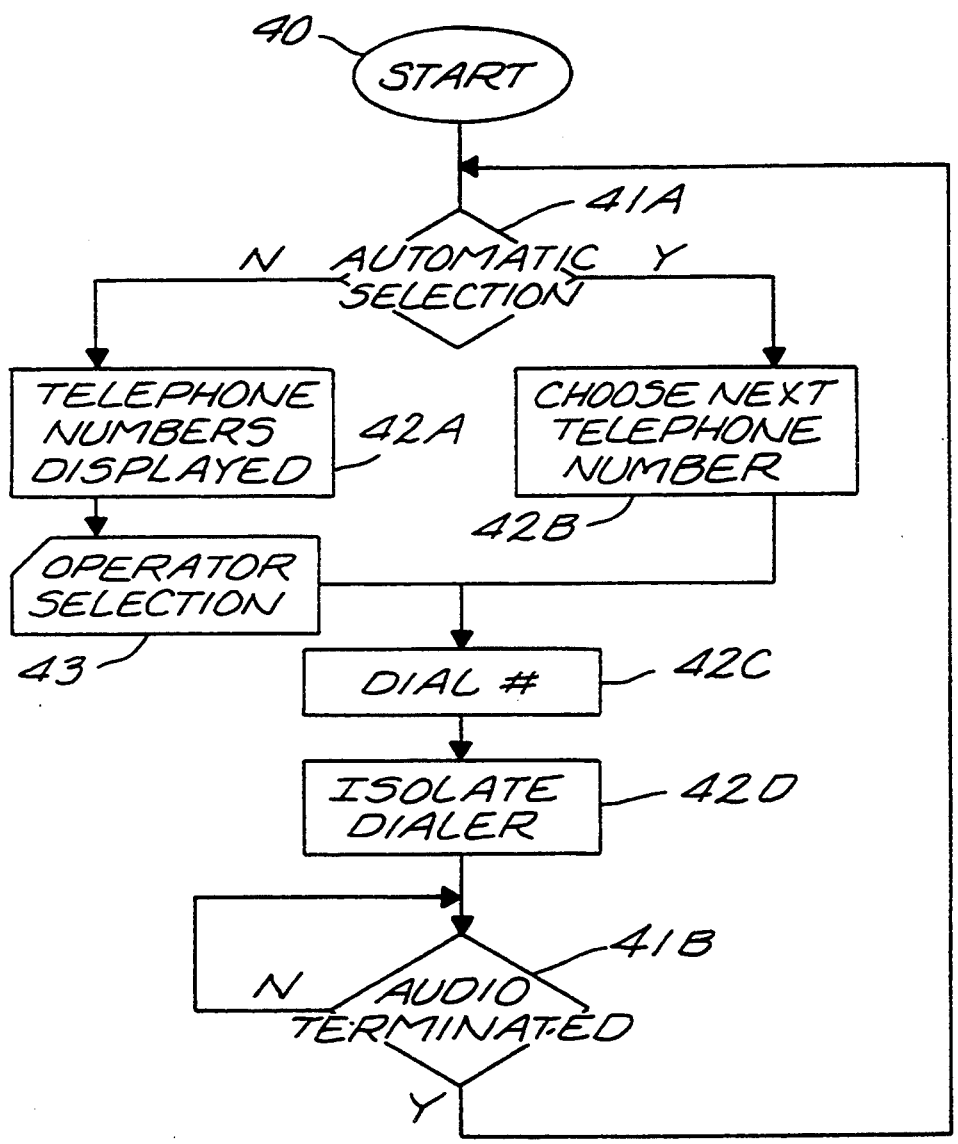

FIG. 4 is flow-chart of the preferred embodiment's capability to automatically choose phone numbers and then to dial them for the operator.

Figure 5:
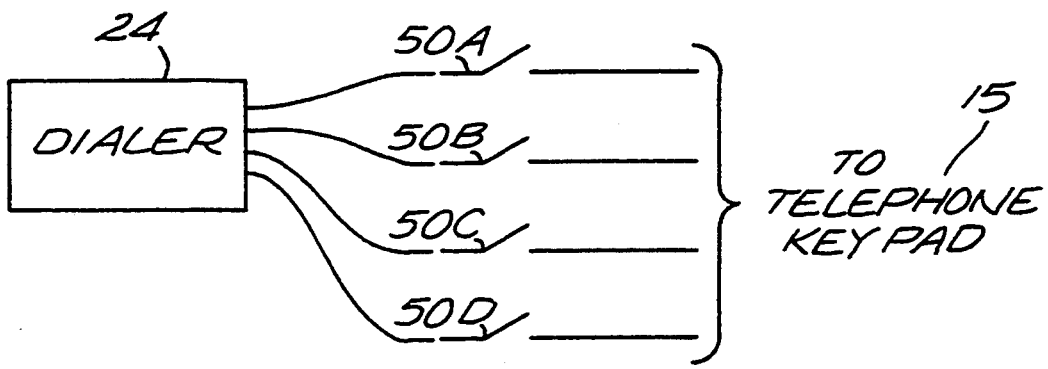

FIG. 5 is an electrical layout showing the ability to isolate the system during audio transmission.

DRAWINGS IN DETAIL

Figure 1:
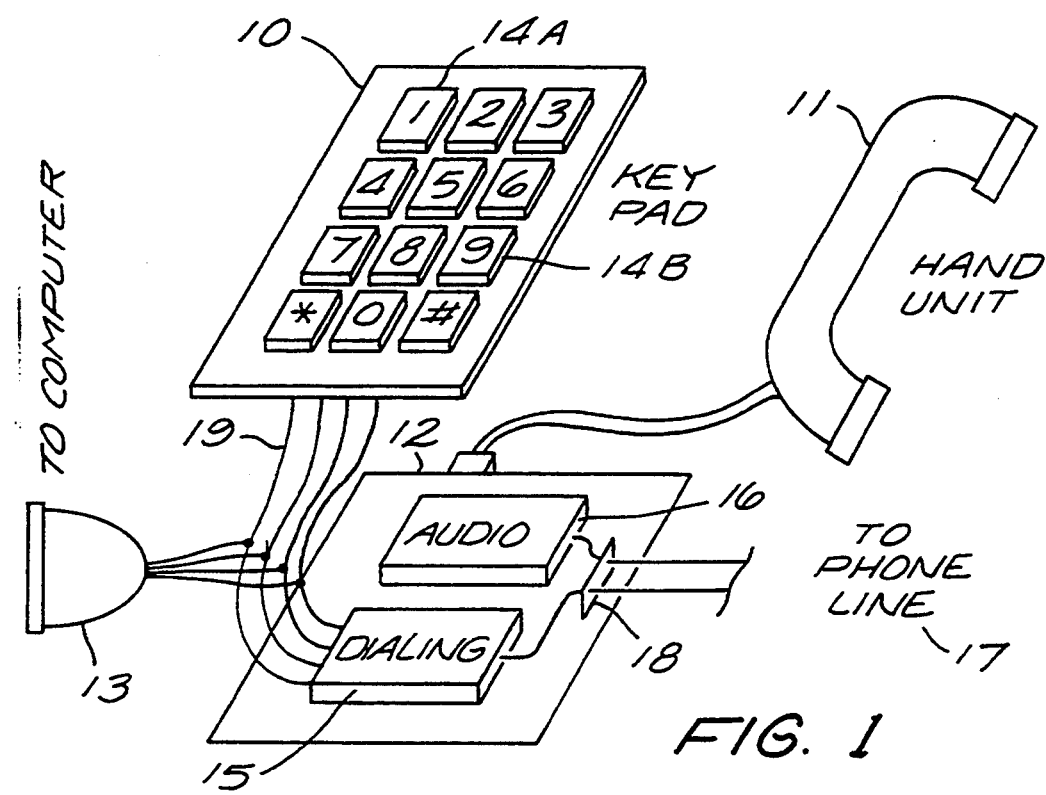
FIG. 1 is a system layout of the preferred embodiment of the invention illustrating how the phone system is modified.

FIG. 1 is a system layout of the preferred embodiment of the invention illustrating how the phone system is modified.

A basic phone system is composed of: keypad 10 communicating with dialing electronics 15; and, hand unit 11 communicating with audio electronics 16. The dialing electronics 15 and audio electronics 16 communicate with the phone line 17 via connector 18.

In operation, the user/operator presses dialing buttons, such as 14A and 14B, to indicate the desired telephone number. These numbers are communicated via linkage 19 to the dialing electronics 15 which puts the telephone numbers in proper format for use by the telephone's system of switching (not shown). Once connected to another telephone, the user communicates aurally via hand unit 11 which transmits an electronic signal to the audio electronics 16.

In the preferred embodiment, this traditional arrangement is altered slightly by providing connector 13 which is to communicate with a computer (not shown). Connector 13 is connected to linkage 19 permitting signals from the computer (not shown) to be interpreted by the dialing electronics 15 as coming from keypad 10.

The entire operation is totally transparent to the telephone as it operates in the same manner as it always has. The interruption of the linkage 19 permits the computer to "dial" whatever number it so desires; yet, the dialing circuitry is a one-way transmission, no incoming material can be communicated back to the computer as no pathway exists for its communication. The system is secure.

Figure 2:
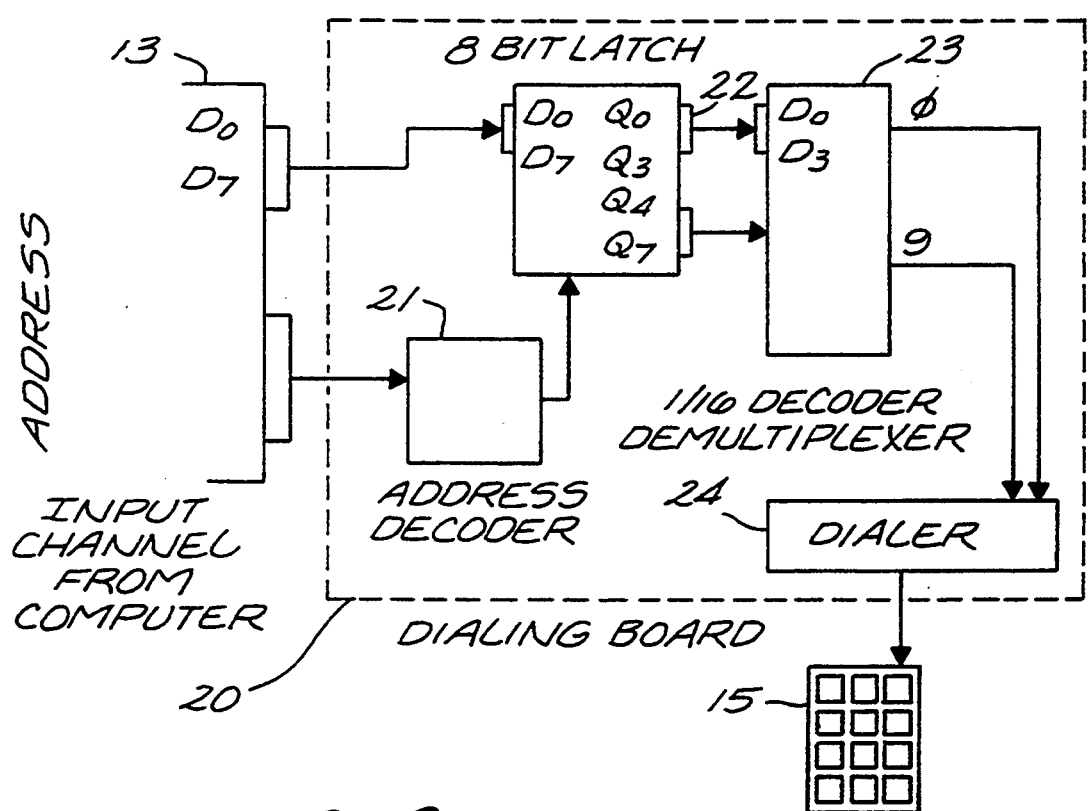
FIG. 2 is an electrical layout of the preferred embodiment illustrating how data from a computer is manipulated to actuate the dialing mechanism of the phone.

FIG. 2 is an electrical layout of the preferred embodiment illustrating how data from a computer is manipulated to actuate the dialing mechanism of the phone.

In order for the computer to properly communicate with the linkage as shown in FIG. 1, a certain amount of electronic organizing must be done. To this end, the schematic of FIG. 2 shows the preferred layout to accomplish this task.

The Dial Tone Modulator Frequency (DTMF) chip used in most phones is addressed using a three column and four row arrangement (corresponding to the telephone's keypad). To create this type of signal for the DTMF, the address from the computer's input channel 13 is communicated to an address decoder 21 (a commercially available 74LS138 in the preferred embodiment). A signal from the address decoder 21, together with a signal from the input channel 13, is communicated to an 8-bit latch 22 (a commercially available 74LS374 in the preferred embodiment) which creates the proper signal as represented by Q0 through Q3, communicated to the 1/16 decoder demultiplexer 23 (a commercially available 74LS154 in the preferred embodiment). The signal from the demultiplexer 23 is communicated to the dialer 24 which puts the 0-9 signal into proper row/column for the dialing electronics 15.

The use of relays in dialer 24 permit the isolation of the signals so that no signals can be communicated in reverse, from the dialer 24 to the demultiplexer 23.

FIGS. 3A, 3B, 3C, and 3D are block diagrams illustrating various embodiments of the invention showing differing configurations.

Figure 3A:
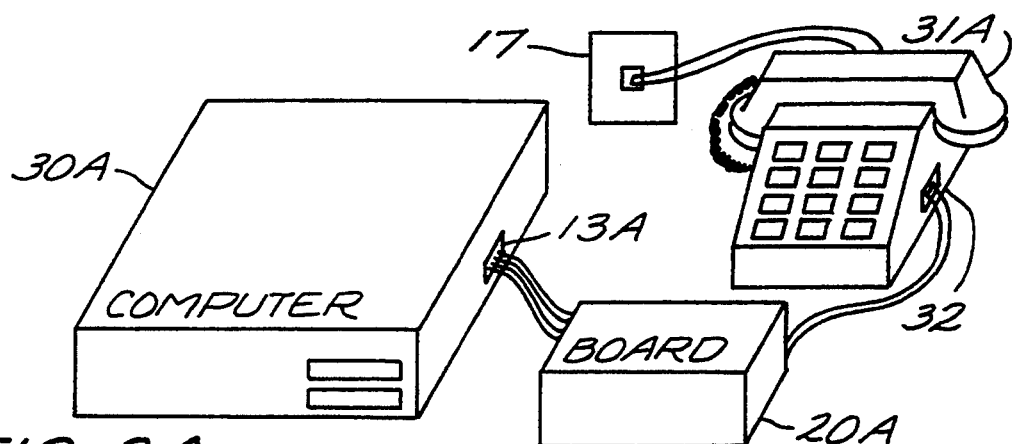

FIG. 3A shows the preferred embodiment of the invention. Computer 30 is a traditional computer, the monitor and the keyboard are not shown for ease of illustration. Computer 30A communicates with board 20A via port 13A. Port 13A is any of those available on the computer such as a serial port, a parallel port, or a game port. Board 20A is structured in a manner similar to that shown in FIG. 2 for rearranging and formatting of signals which are then communicated to telephone 31A via connector 32. Telephone 31A has been modified in a manner similar to that described in FIG. 1.

Telephone 31A communicates with the telephone line via connector 17.

In this embodiment, board 20A is external to the computer and the telephone 31A and is useful as a peripheral requiring no hardware modification of computer 30A.

In this manner, the computer is able to dial the desired telephone number via board 20A and telephone 31A, permitting the user/operator to carry on an aural communication after dialing by using the handset from telephone 31A. In this context, the handset is equivalent to other devices well known to those of ordinary skill in the art including headsets and speaker-phone modules.

Figure 3B:
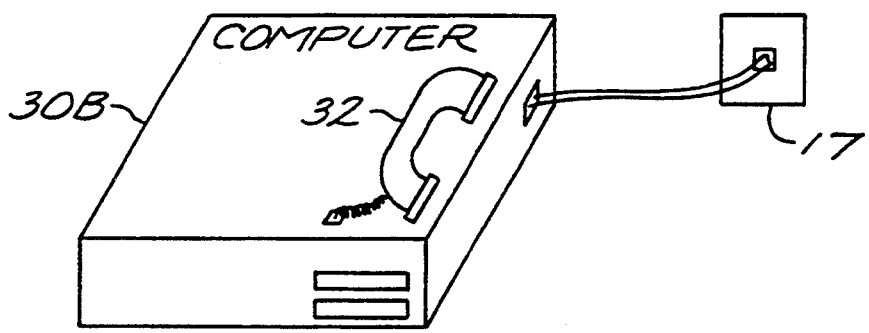

FIG. 3B illustrates an embodiment of the invention in which both the telephone and the board, as illustrated in FIG. 3A, have been fully incorporated into the computer 30B. In this embodiment, the computer 30B communicates directly with telephone connector 17. The user/operator is able to use handset 32 for aural communications.

Figure 3C:
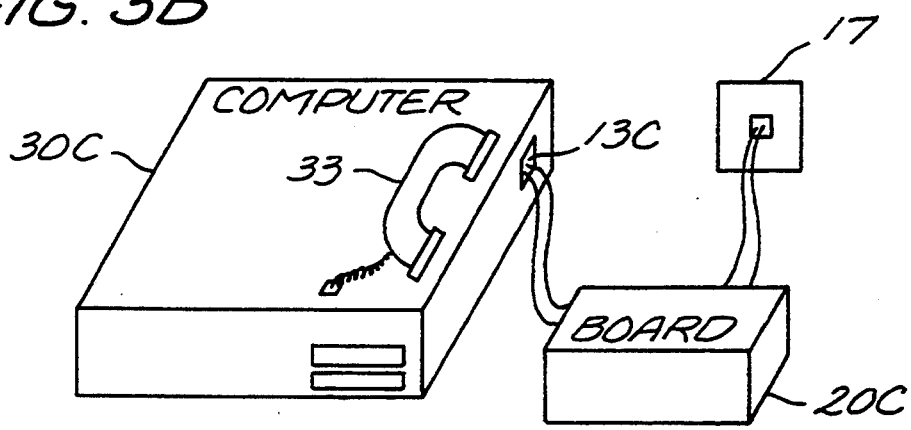

FIG. 3C illustrates an embodiment of the invention in which the telephone has been incorporated into computer 30C while the interface board 20C is used as a peripheral. Computer 30C communicates with board 20C via connector 13C. Again, board 20C communicates with the telephone system via connector 17. Handset 33 is used by the operator/user for aural communication which is transmitted via the internal telephone system (not shown), connector 13C, board 20C, and then to connector 17; in this manner, the aural communication is easily accomplished.

Figure 3D:
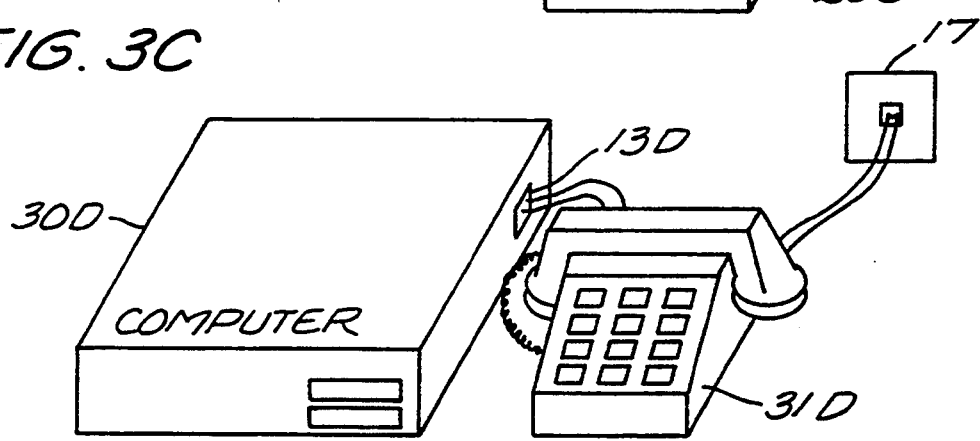

FIG. 3D illustrates an embodiment of the invention in which the board is internal to computer 30D while the telephone 31D acts as a peripheral thereto. Computer 30D communicates via connector 13D with telephone 31D which is connected to the telephone system via connector 17.

FIG. 4 is flow-chart of the preferred embodiment's capability to automatically choose telephone numbers and then to dial them for the operator.

After start of operation 40, a determination is made if automatic selection 41A is to be done. With automatic selection, the computer chooses the next available telephone number 42B; without automatic selection, the available telephone numbers are displayed 42A and the user/operator selects one of them 43. This selection is done either by use of a keyboard entry or mouse highlighting of the telephone number.

The computer then dials the selected telephone number 42C and isolates the dialer 42D so that stray signals do not create noise in the telephone system.

A check is made for the termination of audio transmission 41B. This check is done through a variety of methods well known to those of ordinary skill in the art including: termination of audio transmission for a defined period of time; checking for handset replacement onto the telephone cradle; or operator entry of a signal (e.g. a keyboard button pressed) that the call has been terminated.

Once the call has been terminated, the program returns and continues with the process. In one embodiment of the invention, a clock inside the computer is used to document certain facts abut the telephone conversation such as start of call and duration of call.

In this manner, the computer automatically performs the phone dialing function, thereby relieving the operator of this task.

FIG. 5 is an electrical layout showing the ability to isolate the system during audio transmission.

As noted earlier, isolating the dialer from the phone system keeps stray signals from causing noise in the telephone. To this end, the preferred embodiment uses a series of relays 50A, 50B, 50C, 50D, which are closed during the dialing process and are open when no dialing is being done. In this diagram, four lines are used for illustration purposes only. Those of ordinary skill in the art recognize that more lines will be required in this context. These relays provide an absolute barrier and prevent any stray signals from being communicated.

It is clear that the present invention creates a highly versatile mechanism for the automatic dialing of telephone numbers while keeping the related computer isolated and free from tampering.

What is claimed is:

1. A telephone dialing system comprising:
   a) a telephone having,
      1) a number keypad means for operator entry of values,
      2) a dialing circuit means for communicating said values to a telephone line,
      3) linkage means for communicating said values from said keypad means to said dialing circuit means, and,
      4) a handset for vocal communication via said telephone line;
   b) a computer having a memory means for storing at least two series of values; and,
   c) a communication channel for communicating a selected one of said at least one series of values from said memory means to said linkage means.

2. The telephone dialing system according to claim 1 wherein said computer further includes means for isolating said communication channel except during transmission of a selected one of said at least one series of values.

3. The telephone dialing system according to claim 2 wherein said telephone includes an audio interface means for receiving aural signals from a user and for communicating electronic representations thereof to said telephone line.

4. The telephone dialing system according to claim 2 further including a user interface communicating with said computer and wherein said means for selecting includes means for user identification of the selected phone number.

5. The telephone dialing system according to claim 2 wherein said computer includes means for sequentially withdrawing a series of numbers from said memory means.

6. The telephone dialing system according to claim 2 further including means for determining user termination of use of said audio phone channel.

7. The telephone dialing system according to claim 6 wherein said means for sequentially withdrawing is activated by user termination of use of said audio phone channel.

8. The telephone dialing system according to claim 7 further including means for operator disconnection of said audio phone channel from said telephone line.

9. The telephone dialing system according to claim 8 wherein said means for operator disconnection includes speech recognition means.

10. The telephone dialing system according to claim 6 further including a clock and wherein said computer includes means for logging a start and a stop of audio transmission over said audio interface based upon data from said clock.

11. A computer and phone system comprising a housing unit having therein:
    a) a phone interface having,
       1) an audio circuit communicating with an external telephone line for communicating an audio signal thereto, and,
       2) a dialing phone channel communicating with said external telephone line for communicating electronic signals thereto;
    b) a handset for audio communications communicating with said audio circuit; and,
    c) a computer having
       1) memory means containing a series of phone numbers stored therein, and,
       2) means for selecting one of said phone numbers and for communicating the selected phone number to said dialing phone channel.

12. The computer and phone system according to claim 11 further including means for isolating said computer from said dialing circuit during periods of inactivity.

13. The computer and phone system according to claim 12 further including an audio interface for receiving audio signals and for communicating audio signals to said audio phone channel.

14. The computer and phone system according to claim 13 wherein said audio interface is in said housing unit.

15. The computer and phone system according to claim 13 wherein said audio interface is external to said housing unit.

16. The computer and phone system according to claim 12 further including a user interface communicating with said computer and wherein said means for selecting includes means for user identification of the selected phone number.

17. The computer and phone system according to claim 12 wherein said means for selecting includes means for sequentially withdrawing phone numbers from said memory means.

18. The computer and phone system according to claim 12 further including means for determining user termination of use of said audio phone channel.

19. The computer and phone system according to claim 18 wherein said means for choosing is activated by user termination of use of said audio phone channel.

20. The computer and phone system according to claim 18 further including means for operator disconnection of said audio phone channel from said telephone line.

21. The computer and phone system according to claim 20 wherein said means for operator disconnection includes speech recognition means.

22. The computer and phone system according to claim 12 further including a clock and wherein said computer includes means for logging a start and a stop of audio transmission over said audio communication channel based upon data from said clock.

* * * * *